(12) United States Patent
Lee et al.

(10) Patent No.: US 7,464,597 B1
(45) Date of Patent: Dec. 16, 2008

(54) SYSTEM AND METHOD FOR INDUCING A PYROTECHNIC TYPE SHOCK EVENT

(75) Inventors: Chi C. Lee, Riverside, CA (US); Michael Alan Hiersche, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/781,488

(22) Filed: Jul. 23, 2007

(51) Int. Cl.
*B06B 3/00* (2006.01)
*B06B 1/00* (2006.01)
(52) U.S. Cl. .......................... 73/663; 73/666
(58) Field of Classification Search ................ 73/663, 73/664, 665, 666, 667, 668
See application file for complete search history.

(56) References Cited

U.S. PATENT DOCUMENTS

| | | | | |
|---|---|---|---|---|
| 2,706,400 A | * | 4/1955 | Unholtz | 73/666 |
| 5,083,463 A | * | 1/1992 | Marshall et al. | 73/663 |
| 6,484,580 B2 | * | 11/2002 | Eagen et al. | 73/571 |
| 7,051,593 B2 | * | 5/2006 | Fletcher | 73/665 |
| 7,267,010 B2 | * | 9/2007 | Lund | 73/663 |

* cited by examiner

*Primary Examiner*—Edward Lefkowitz
*Assistant Examiner*—Punam Patel
(74) *Attorney, Agent, or Firm*—Charles L. Moore; Moore & Van Allen, PLLC

(57) ABSTRACT

A system for inducing shock may include a first slap plate attached to a shaker armature of a shaker table system to impart a shock to any object being tested by the system. The shock is amplifiable by use of the first slap plate compared to the object being coupled to the shaker armature without the first slap plate. The system may also include a specific attachment arrangement for attaching the first slap plate to the shaker armature. The specific attachment arrangement and a configuration of the first slap plate may be selected to control a level of shock imparted to the object being tested.

23 Claims, 8 Drawing Sheets

SYSTEM AND METHOD FOR INDUCING A PYROTECHNIC TYPE SHOCK EVENT

BACKGROUND OF THE INVENTION

The present invention relates to testing electronic equipment and the like with respect to withstanding shock and other environmental conditions, and more particularly to a system and method for inducing a pyrotechnic type shock similar to those experienced during the launch of a space vehicle, satellite or the like.

Components and devices used on space vehicles, such as electronic components, devices, mechanism or the like, need to be able to withstand the rigors of a space launch that may include extreme shock or vibrations such as those caused by pyrotechnic shock events, for instance, ignition, liftoff, stage separations, payload fairing separations, spacecraft separations, solid rocket motor jettisons or similar events. These shock environments or events are difficult to duplicate or simulate. Actually using explosives or pyrotechnic materials, primer cords, etc., can be time consuming and expensive to set up and difficult to control. Electrodynamic exciters and impact hammers may also be used for simulations; however, such devices typically require expensive modifications to simulate a high energy-level shock event such as those associated with a space launch.

BRIEF SUMMARY OF THE INVENTION

In accordance with an embodiment of the present invention, a system for inducing shock may include a first slap plate attached to a shaker armature of a shaker table system to impart a shock to any object being tested by the system. The shock is amplifiable by use of the first slap plate compared to the object being coupled to the shaker armature without the first slap plate. The system may also include a specific attachment arrangement for attaching the first slap plate to the shaker armature. The specific attachment arrangement and a configuration of the first slap plate may be selected to control an amount or level of shock imparted to the object being tested.

In accordance with another embodiment of the present invention, a fixture for inducing shock forces to a test specimen may include a slap plate attached to a shaker armature of a shaker table system by a selected number and location of fasteners on the slap plate to allow the slap plate to strike against the shaker armature when exposed to shaker induced shock. The system may also include a host platform attached to the slap plate by a selected number and location of fasteners, wherein the host platform is adapted to hold the test specimen and transfer shock to test specimen from the shaker armature and slap plate.

In accordance with another embodiment of the present invention, a method for inducing shock may include attaching a slap plate to a shaker armature of a shaker table system to impart a shock to any object being tested by the system. The method may also include using a specific attachment arrangement for attaching the slap plate to the shaker armature to control an amount or level of shock imparted to any object being tested.

In accordance with another embodiment of the present invention, a method for inducing shock may include amplifying a shock force from a shaker armature of a shaker system by attaching a slap plate to the shaker armature. The method may also include controlling an amount or level of amplification of the shock force imparted to the object being tested by using a specific attachment arrangement for attaching the slap plate to the shaker armature and using a specific configuration of the slap plate.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
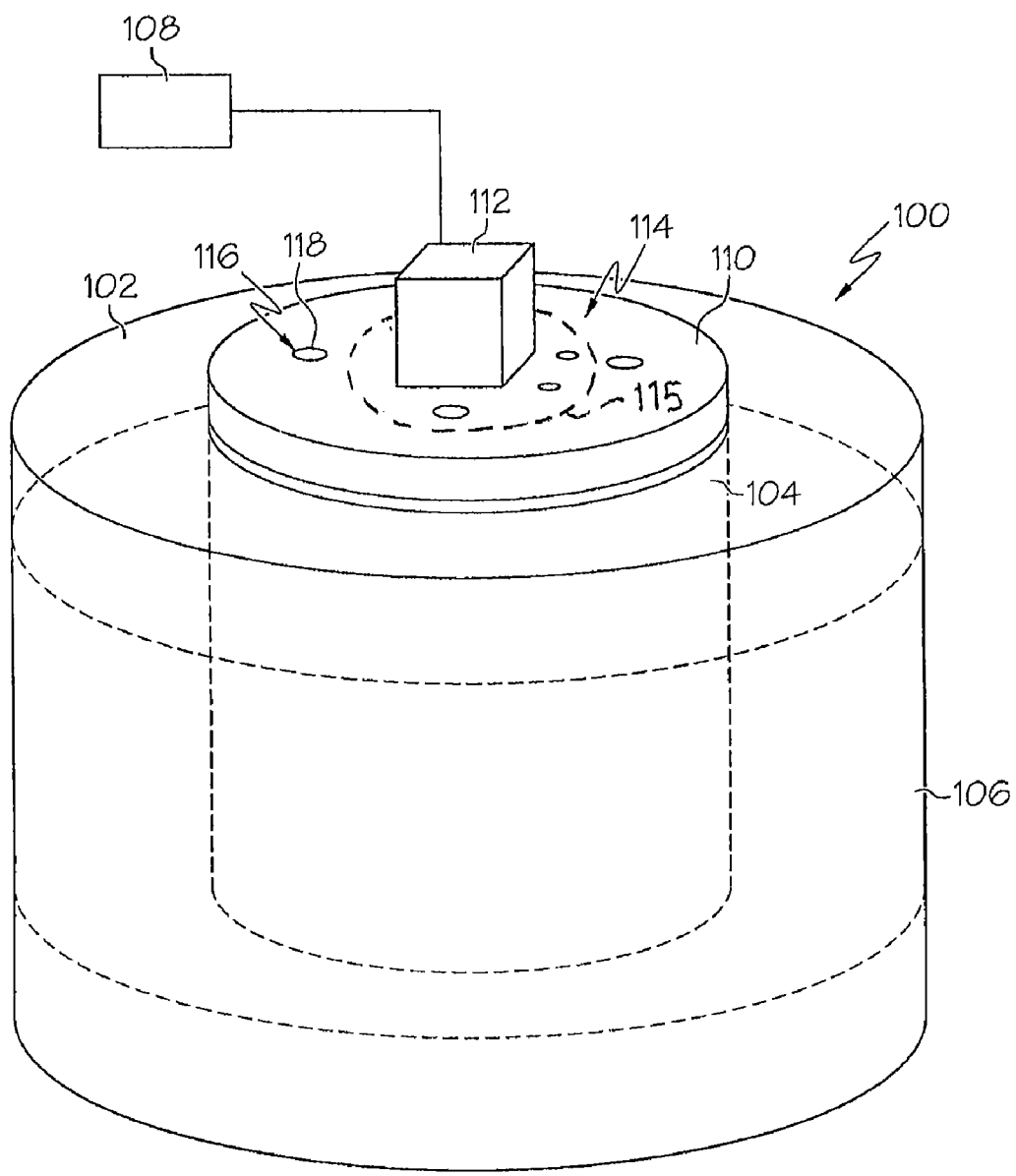
FIG. 1 is a perspective view of an example of a system for inducing shock similar to a pyrotechnic event in accordance with an embodiment of the present invention.
Figure 2:
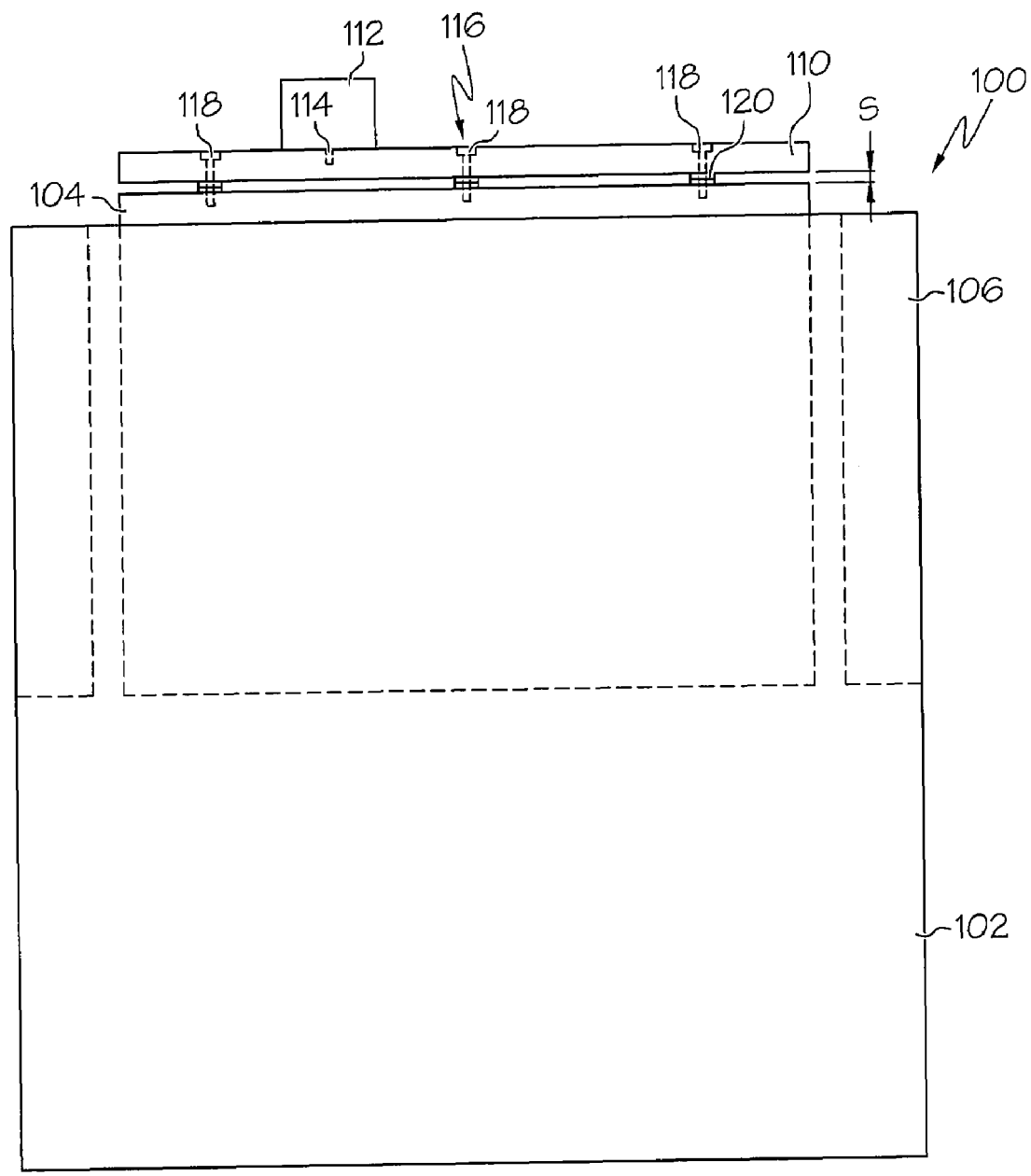
FIG. 2 is a side elevation view of the system of FIG. 1.

FIG. 1 is a perspective view of an example of a system 100 for inducing shock similar to a pyrotechnic event in accordance with an embodiment of the present invention. The system 100 may include a shaker table system 102. Examples of a shaker table system may include an Unholtz-Dickie Model Number T-1000 as manufactured by Unholtz-Dickie of Wallingford, Conn.; a Ling Model Number L335 shaker table as manufactured by Chroma ATE, Inc. of Taiwan. A shaker armature 104 may be positioned within the shaker table system 102. Referring also to FIG. 2, FIG. 2 is a side elevation view of the system 100 of FIG. 1. The shaker system field coil 106 may be energized by direct electric current to create a magnetic field surrounding the shaker armature 104. A high-energy level shock pulse or extreme vibration may be imparted to the shaker armature 104 by the application of alternate electric current to the armature driver coil. In a typical shaker table system 102, the electrical energy is converted to kinetic energy, displacing the moving element, the shaker armature 104, at high rate of velocity thereby inducing high-energy level shock pulse or extreme vibration to a test specimen.

A slap plate 110 may be attached to the shaker armature 104 of the shaker table system 100 to impart a higher-energy shock or shock forces to any object 112 being tested by the system 100. The object 112 may be electrically coupled to measurement and recording instrumentation 108 (shown in FIG. 1) to measure and/or record the high-energy shock or shock forces being imparted to the object 112. Other sensors (not shown in the drawings) may also be attached to the slap plate 110 to detect the shock forces being applied. The slap plate 110 may define or constitute a fixture to which the object 112 may be mounted. The slap plate 110 or fixture may include multiple receptacles 114 or other features that can be utilized to attach electronic components or other objects for shock testing. In another embodiment of the present invention, a fixture 115 illustrated by the broken or dashed line in FIG. 1 or host platform to attach objects for test may be mounted to the slap plate 110. An example of mounting a fixture or a second slap plate will be described with reference to FIGS. 3 and 4 and an example of mounting a fixture, such as a tombstone-shaped fixture or bookend will be described with reference to FIGS. 7 and 8.

The object 112 may be an electronic component, device or mechanism being tested to be used on a space vehicle or craft. The shock imparted to the object 112 may be amplified by use of the slap plate 110, as described herein, compared to the object 112 being coupled to the shaker armature 104 without the slap plate 110 or by a traditional fixture with multiple fasteners to securely attach the fixture to the shaker armature 104. In accordance with an embodiment of the present invention, the slap plate 110 is allowed to slap or contact the shaker armature 104 during operation of the shaker table system 100 to amplify the shock forces by reducing the number of fasteners or by other means as described herein.

The slap plate 110 may be attached to the shaker armature 104 by a specific attachment arrangement 116. As described in more detail herein, the specific attachment arrangement 116 and a configuration of the slap plate 110 may be selected to control a level of shock or amplification of the shock or shock forces imparted to the object 112 being tested. For example, the specific attachment arrangement 116 and the configuration of the slap plate as well as other factors or parameters may be selected to generate a shock force that substantially simulates a pyrotechnic event such as those associated with a launch of a space vehicle. The combination of the slap plate 110 attached to the shaker armature 104 by the specific attachment arrangement 116 and the configuration of the slap plate 110 and any fixture that may be attached to the slap plate 110 may be referred to herein as a fixture system or assembly.

The amount or level of shock or amplification of shock imparted to the object 112 may be controlled by a set of factors or parameters associated with the system. Examples of the factors or parameters may include: a number of fasteners 118, bolts or other fasteners attaching the slap plate 110 to the shaker armature 104; a location of each fastener 118 relative to other fasteners 118 or fastener pattern attaching the slap plate 110 to the shaker armature 104; a torque value or load by which each fastener 118 is tightened; a thickness, size and shape of the slap plate 110; a material from which the slap plate is formed; an orientation of the slap plate 110 relative to the shaker armature 104; a spacing ("S") between the slap plate 110 and the shaker armature 104 or a number of spacers 120 associated with each fastener 118 to create the spacing S; and one or more additional slap plates. An example of an embodiment of the system 100 with an additional slap plate will be described with reference to FIGS. 3 and 4. Each of these different factors or parameters and the impact or control of the level of shock imparted to the object 112 will be discussed in more detail herein.

One of possibly the most critical factors of achieving a high level shock on a traditional electromechanical shaker system, such as shaker table system 102, involves the stiffness of the system attributable to the number of fasteners or bolts that may be used to attach the slap plate 110 to the shaker armature 104. In a dynamic system, mechanical fasteners, such as fasteners 118, can be viewed as springs with individual stiffness coefficients. The overall stiffness of the fixture system or attachment of the slap plate 110 to the shaker armature 104 may be controlled by the number of fasteners 118. The stiffness of the fixture system may be significantly increase by additional bolts or fasteners securing a fixture or slap plate 110 to the shaker armature 104. Conversely, a significant increase in shock response may be achieved by reducing the number of fasteners and allowing the slap plate 110 to impact or slap against the shaker armature 104 and induce a higher magnitude or higher energy shock or shock force than with more fasteners. Further reduction of fasteners securing the slap plate 110 or test fixture to the shaker armature 104 may allow additional high frequency responses induced by impact or shock, while providing desirable controllability for operation or vibration of the system 100 below about 3 kHz. A significant gain in high frequency response of the system 100 allows for a reduction in overstressing the shaker system 100 and permits shock levels to be achieved that were historically only possible by using actual pyrotechnic techniques.

Not only can the number of fasteners 118 have a significant impact on the shaker system 102 to induce shock response, but the fastener pattern or location of each fastener 118 relative to other fasteners 118 may also provide some control of the amount or level of shock or shock forces imparted to an object. As in any dynamics system, every object has specific modal response characteristics. Depending on the test requirement spectrum, different fastener configurations or patterns can be beneficial or even disadvantageous in controlling the amount or level of shock or shock forces imparted to an object being tested.

Another factor or parameter in controlling an amount of shock force applied to an object being tested may be the torque by which each fastener 118 is tightened to attach the slap plate 110 to the shaker armature 104. As previously described, the fasteners 118 may be viewed as springs in a dynamics system. That being the case, a torque value used to tighten down the fasteners 118 or bolts affects the stiffness coefficient of the fasteners 118. The higher the torque load, the more rigid the fastener 118 or bolt will behave or react. However, if the mechanical fastener torque value or load is reduced, the fastener will become more flexible. The stiffness of the fasteners can make a noticeable impact on the electromechanical shaker induced shock response. Higher torque values can be beneficial in providing high frequency transmissibility between the shaker armature 104 and the slap plate 110. By reducing the toque, the spring stiffness of the fastener 118 is reduced, allowing the slap plate 110 to flex more and provide a greater impact that can result in an increase in the high frequency response of the slap plate 110 or increase in the shock force transferred to the object 112.

Another factor or parameter in controlling an amount of shock force applied to an object being tested may be the slap plate 110 design or fixture design. The thickness of the slap plate 110 or fixture can influence the shock response. One of the most fundamental principles of any dynamics test is Isaac Newton's second "Law of Motion," which states that the force of an object is equivalent to the product of its mass multiplied by its accelerations. Based on this principle, reducing the mass of the slap plate 110 may provide increased acceleration, since the maximum force of the shaker system 102 is relatively constant and a known value. An increase in thickness of the slap plate 110 increases the mass and stiffness of the dynamic fixture system. The additional stiffness of the fixture system causes the natural fundamental frequency response of the system 100 to be shifted to a higher frequency, as expected with a simple mass-spring vibration system. The rigidity of the fixture or slap plate 110 allows an increase in the high frequency response, but also the increase of weight may possibly contribute to a greater impact between the slap plate 110 and the shaker armature 104. Accordingly, the slap plate 110 having different sizes and shapes may affect the shock response characteristics or level of shock or shock forces imparted to the object 112.

Another important design factor associated with the slap plate 110 is the material from which the slap plate 110 may be made. The slap plate 110 is typically made from a metal material, such as aluminum, magnesium or a similar metal or alloy. Magnesium exhibits favorable density properties, such as low weight and a less attenuated high frequency shock response when compared with an aluminum fixture of the same dimensions.

Figure 3:
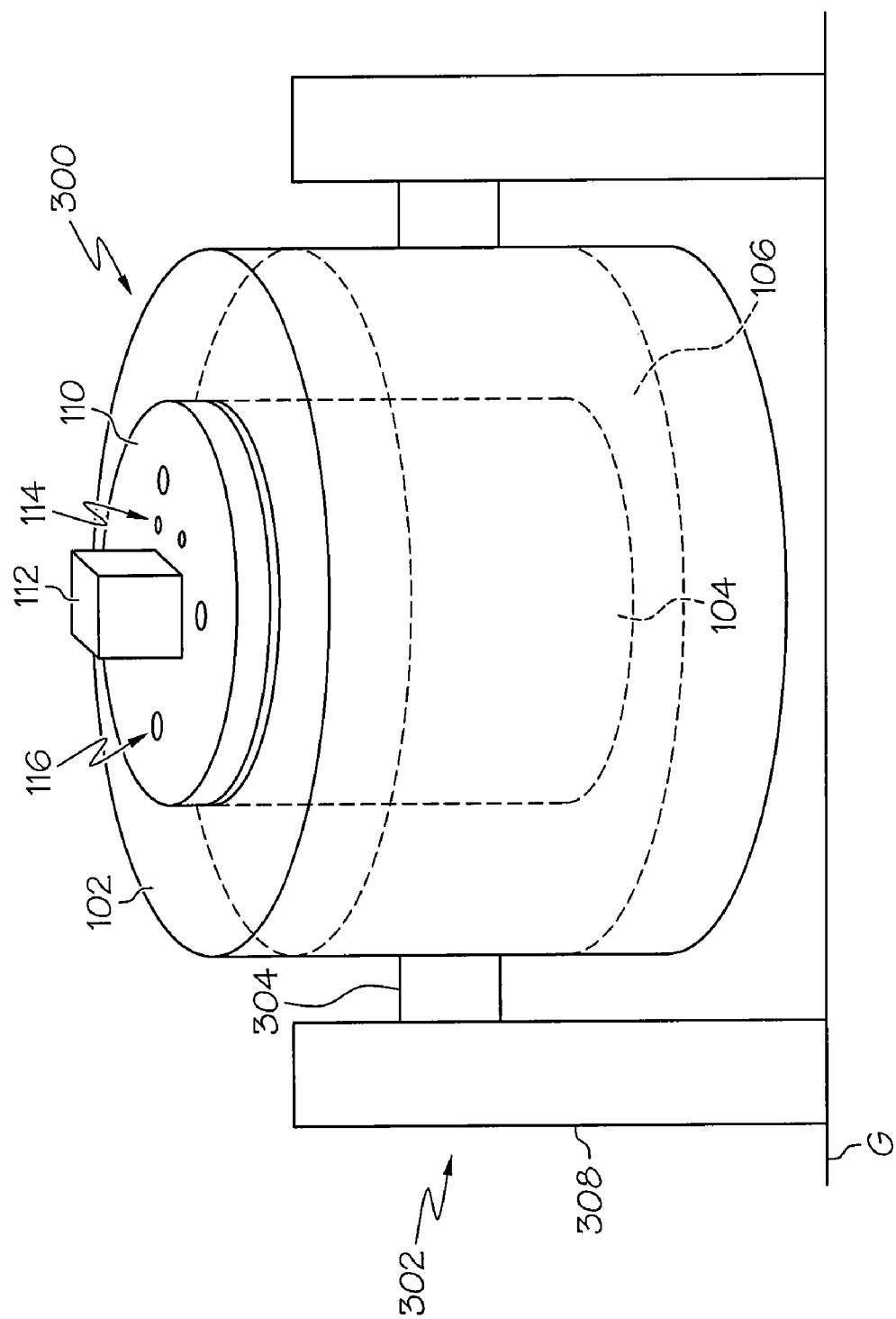
FIG. 3 is a perspective view of an example of a system for inducing shock similar to a pyrotechnic event including a trunnion assembly in accordance with an embodiment of the present invention.
Figure 4:
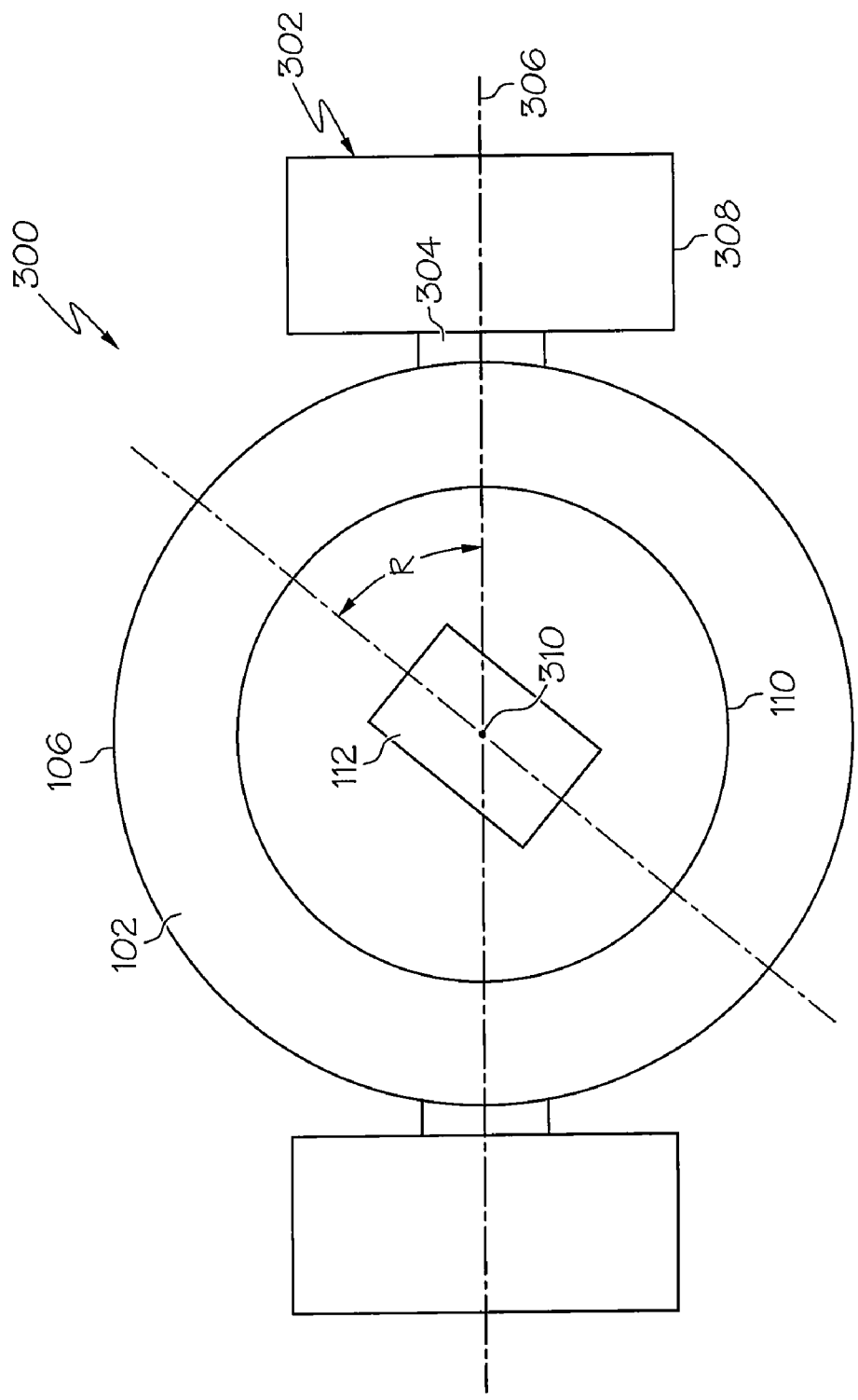
FIG. 4 is a top elevation view of the system of FIG. 7.

Another factor or parameter in controlling an amount of shock force applied to an object being tested may be the orientation of the slap plate 110 or fixture relative to the shaker armature 104. Referring to FIGS. 3 and 4, FIG. 3 is a perspective view of an example of a system 300 for inducing shock similar to a pyrotechnic event including a trunnion assembly 302 in accordance with an embodiment of the present invention. FIG. 4 is a top elevation view of the system 300 of FIG. 3. A shaker trunnion 304 may support the shaker table 102 to position the table 102 at different angles during testing. A position of the shaker trunnion 304 relative to the slap plate 110 may be used to control the shock response or level of shock forces applied to the object 112. The shaker trunnion 304 may typically be positioned through the center of the shaker armature 104, as illustrated by centerline 306 in FIG. 4, to provide a load path from ground "G" (FIG. 7) through trunnion stanchion 308 and trunnion 304 to the slap plate 110. FIG. 4 shows a relative angular position "R" of the object 112 being tested with respect to the trunnion 304 or centerline 306 of the trunnion 304. According to the fundamental principles of Isaac Newton's third "Law of Motion," which states that for every force or every action there is an equal and opposite reaction. Based on this principle, the rotations of the object 112 or test specimen forty-five to ninety degrees about the vertical axis 310 relative to the trunnion 304 may produce significantly different results. The change of fixture position or object 112 position may provide a more rigid mechanical coupling. The rigid mechanical coupling is essentially an unyielding reaction mass, providing a more effective load path or improved leverage thus allowing greater shock force to be imparted to the test object 112.

Figure 5:
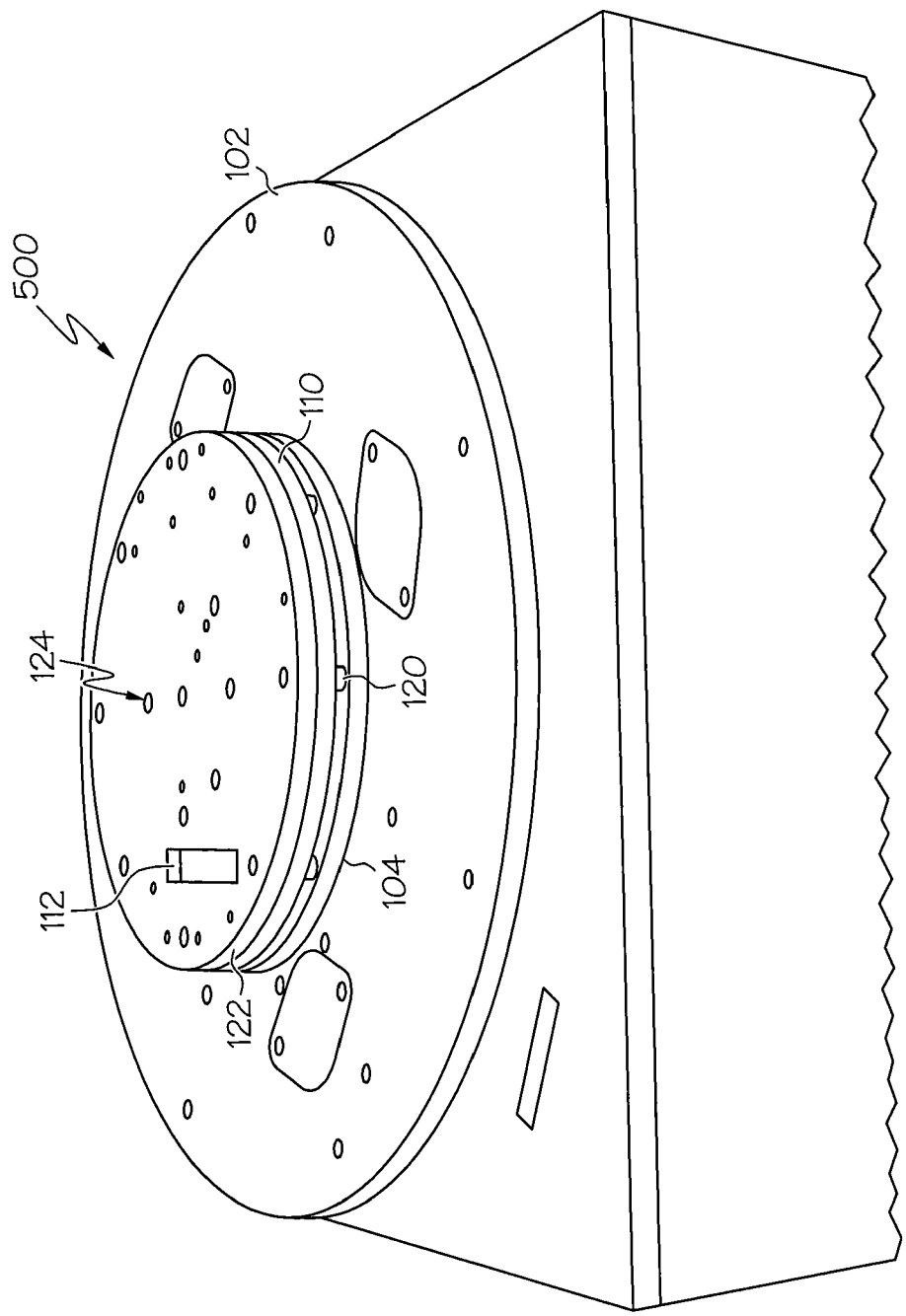
FIG. 5 is a perspective view of an example of a system for inducing shock similar to a pyrotechnic event in accordance with another embodiment of the present invention.
Figure 6:
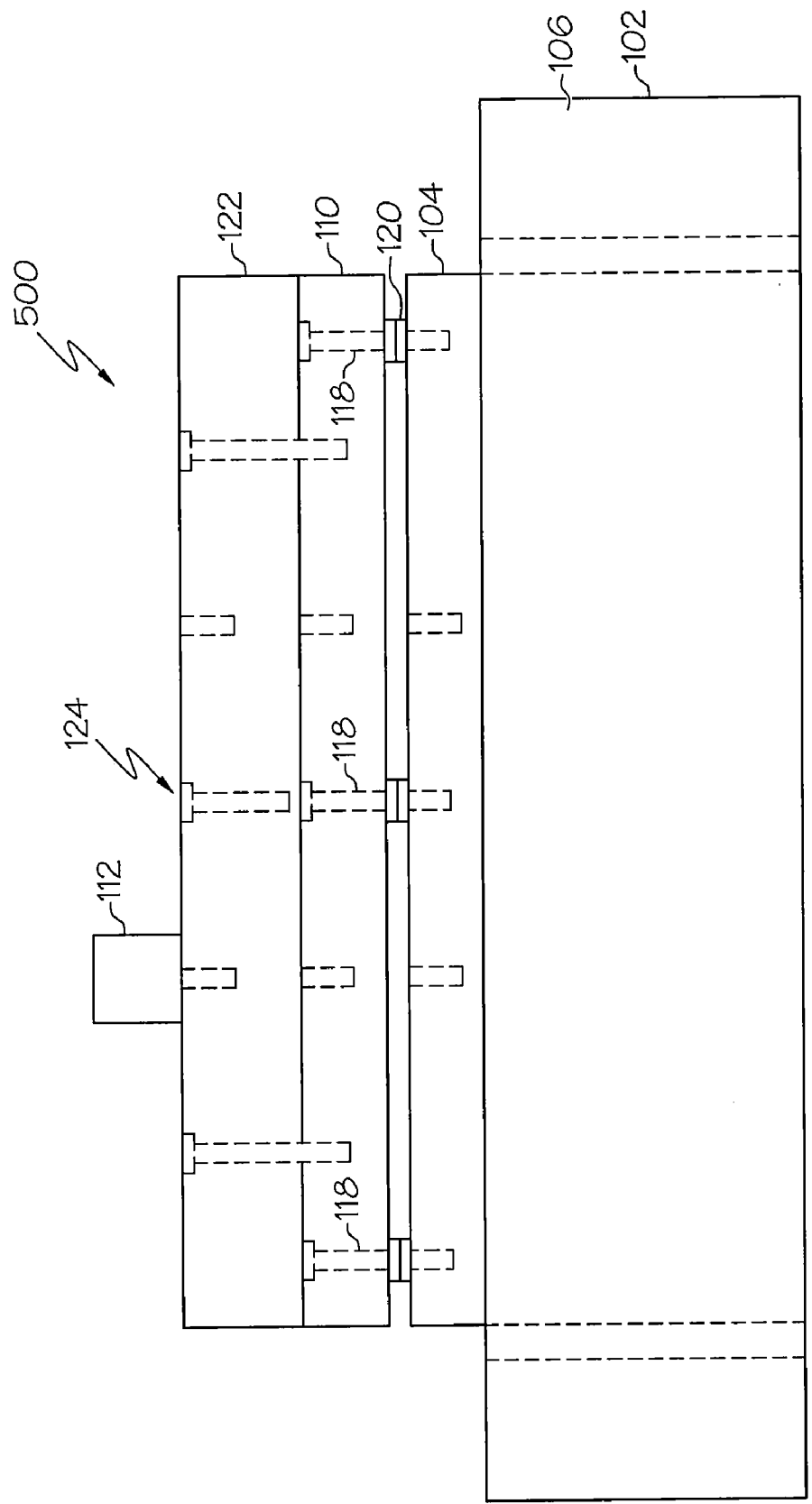
FIG. 6 is a side elevation view of the system of FIG. 5.

Another factor for controlling amplification of the test fixture response or shock forces imparted to the object 112 is the addition of another slap plate. Referring to FIGS. 5 and 6, FIG. 5 is a perspective view of an example of a system 500 for inducing shock similar to a pyrotechnic event in accordance with another embodiment of the present invention. The system 500 is similar to the system 100 of FIG. 1 with the addition of another slap plate 122. The second slap plate 122 may be attached to the first slap plate 110 or fixture by a second specific attachment arrangement 124. All of the factors or parameters described above with respect to the first slap plate 110 or fixture may also be used or applied in association with the second slap plate 122. The second slap plate 122 can help increase the overall shock response or shock forces applied to the object 112 by acting as an additional spring in the system and providing another interface for impact.

The second slap plate 122 may have dimensions similar to the first slap plate 110 or fixture. In another embodiment of the present invention, one or the other of the slap plates may have different dimensions to control the shock response or shock forces applied to the object 112 being tested.

The slap plates 110 and 122 or fixtures may be substantially circular in shape or may have another shape, such as square, rectangular, polyhedral or some other shape as may be determined by the object 112 being tested or as a result of some other testing conditions.

Figure 7:
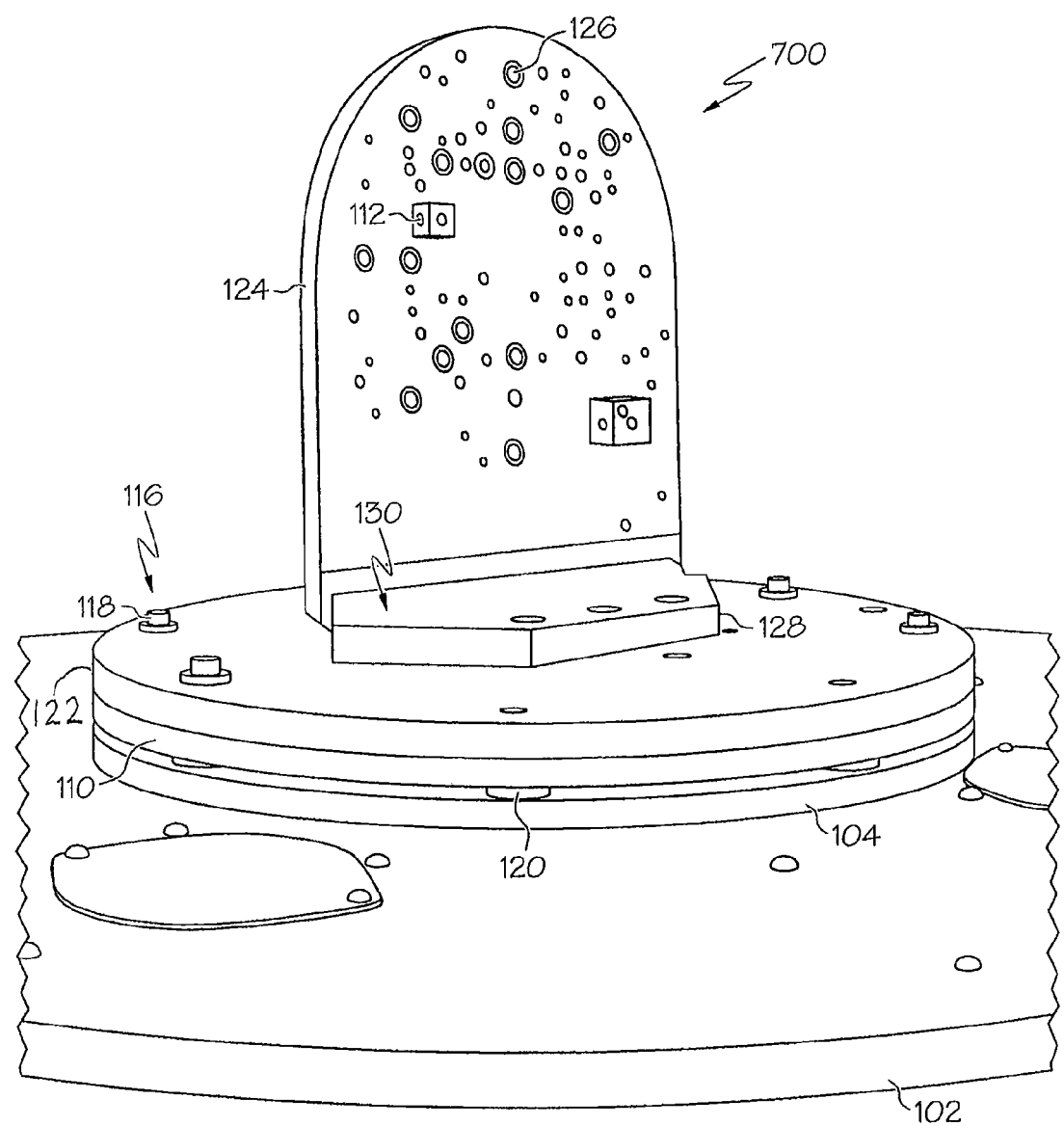
FIG. 7 is a perspective view of an example of a system for inducing shock similar to a pyrotechnic event in accordance with a further embodiment of the present invention.
Figure 8:
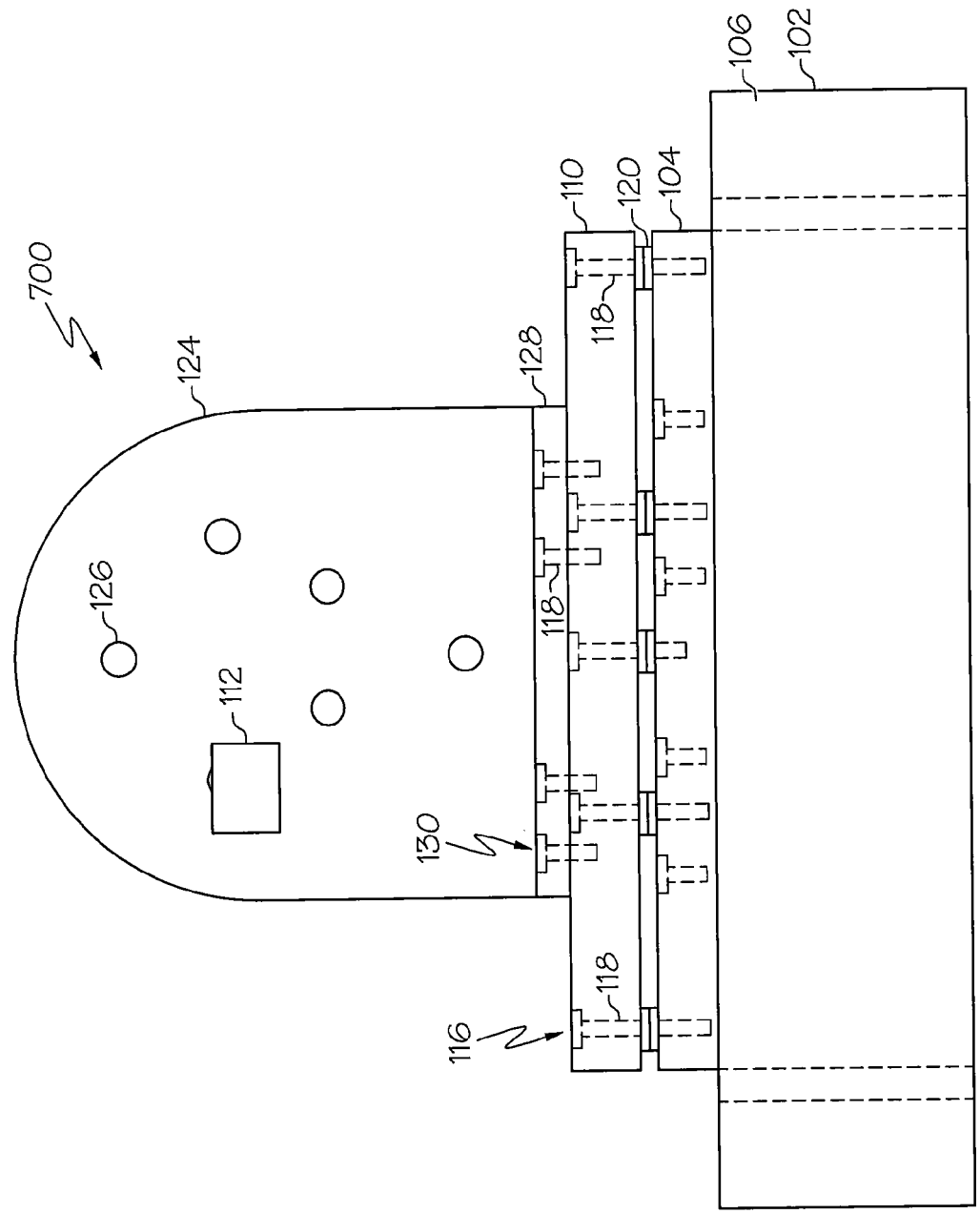
FIG. 8 is a side elevation view of the system of FIG. 7.

FIG. 7 is a perspective view of an example of a system 700 for inducing shock similar to a pyrotechnic event in accordance with a further embodiment of the present invention. FIG. 8 is a side elevation view of the system of FIG. 7. The system 700 may be the same or similar to the system 100 of FIG. 1 except a tombstone-shaped structure 124 may be mounted to the slap plate 110 or fixture. The tombstone 124 includes a plurality of opening 126 or other features for attaching the object 112 to be tested. The tombstone 124 may include a base member 128 of a predetermined configuration to control the shock response or shock forces applied to the object 112. The tombstone 124 may also be attached to the slap plate 110 by a predetermined fastener arrangement or pattern 130 to control the level of shock forces applied to the object 112. The factors or parameters described about with respect to attaching the slap plate 110 to the shaker armature 104 may also be applied to attaching the tombstone 124 to the slap plate 110 or fixture.

Any combination of slap plates, fixtures, tombstones or other mounting means and the factors or parameters discussed herein may be used or applied to control the shock response or level of shock forces that may be applied to the object 112 to be tested. As previously discussed the particular combination of elements may be formed to substantially simulate the pyrotechnic events associated with a space launch in order to test components or devices for suitability for such applications or other applications where such components may encounter high frequency and high magnitude or energy shocks or vibrations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for inducing shock, comprising:
 a first slap plate attached to a shaker armature of a shaker table system to impart a shock to any object being tested by the system, wherein the shock is amplifiable by use of the first slap plate compared to the object being coupled to the shaker armature without the first slap plate; and
 a specific attachment arrangement for attaching the first slap plate to the shaker armature, wherein the specific attachment arrangement and a configuration of the first slap plate are selected to control a level of shock imparted to the object being tested, wherein the specific attachment arrangement selected to control a level of shock imparted to the object being tested comprises:
- a plurality of fasteners attaching the first slap plate to the shaker armature, wherein each of the plurality of fasteners extend through the slap plate and are received in a threaded opening formed in the shaker armature; and
- a predetermined number of spacers associated with each fastener to provide a selected spacing between the first slap plate and the shaker armature.

2. The system of claim 1, wherein the level of shock imparted to the object being tested is controlled by a set of factors comprising a number of fasteners attaching the first slap plate to the shaker armature; a location of each fastener relative to other fasteners attaching the first slap plate to the shaker armature; a torque value by which each fastener is tightened; a thickness, size and shape of the first slap plate; a material from which the first slap plate is formed; an orientation of the first slap plate relative to the shaker armature; a spacing between the first slap plate and the shaker armature or a number of spacers associated with each fastener to form the spacing; and one or more additional slap plates.

3. The system of claim 1, wherein the specific attachment arrangement and the configuration of the slap plate are selected to generate a shock force simulating a pyrotechnic event associated with a launch of a space vehicle.

4. The system of claim 1, further comprising a fixture for mounting any object to be tested, wherein the fixture is mounted to the first slap plate by a predetermined attachment configuration.

5. The system of claim 4, wherein the predetermined attachment configuration comprises a number and pattern of fasteners attaching the fixture to the first slap plate.

6. The system of claim 4, wherein the fixture comprises a circular shape.

7. The system of claim 4, wherein the fixture comprises a selected non-circular shape.

8. The system of claim 4, wherein the fixture has dimensions substantially the same as the first slap plate.

9. The system of claim 4, wherein the fixture has different dimensions compared to the first slap plate.

10. The system of claim 1, further comprising a tombstone for mounting any object to be tested, wherein the tombstone is attached to the first slap plate by a predetermined attachment configuration.

11. The system of claim 10, further comprising a second slap plate disposed on the first slap plate, wherein the tombstone is attached to the second slap plate.

12. A system for inducing shock, comprising:
- a first slap plate attached to a shaker armature of a shaker table system to impart a shock to any object being tested by the system, wherein the shock is amplifiable by use of the first slap plate compared to the object being coupled to the shaker armature without the first slap plate;
- a specific attachment arrangement for attaching the first slap plate to the shaker armature, wherein the specific attachment arrangement and a configuration of the first slap plate are selected to control a level of shock imparted to the object being tested, wherein the specific attachment arrangement selected to control a level of shock imparted to the object being tested comprises a plurality of fasteners attaching the first slap plate to the shaker armature, wherein each of the plurality of fasteners extend through the slap plate and are received in a threaded opening formed in the shaker armature; and
- a second slap plate attached to the first slap plate, wherein any object being tested is attached to the second slap plate.

13. The system of claim 12, wherein the second slap plate directly abuts the first slap plate without any spacing between the first and second slap plates.

14. A fixture for inducing shock forces to a test specimen, comprising:
- a slap plate attached to a shaker armature of a shaker table system by a selected number and location of fasteners on the slap plate to allow the slap plate to strike against the shaker armature when exposed to shaker induced shock;
- an attachment arrangement for attaching the slap plate to the shaker armature, wherein the attachment arrangement and a configuration of the slap plate are selected to control a level of shock imparted to the test specimen, wherein the attachment arrangement to control a level of shock imparted to the test specimen comprises:
  - a plurality of fasteners attaching the slap plate to the shaker armature, wherein each of the plurality of fasteners extend through the slap plate and are received in a threaded opening formed in the shaker armature, and
  - a predetermined number of spacers associated with each fastener to provide a selected spacing between the slap plate and the shaker armature; and
- a host platform attached to the slap plate by a selected number and location of fasteners, wherein the host platform is adapted to hold the test specimen and transfer shock to test specimen from the shaker armature and slap plate.

15. The fixture of claim 14, wherein a level of shock transferred to the test specimen is controllable by the selected number and location of fasteners attaching the slap plate to the shaker armature and attaching the host fixture to the slap plate.

16. The fixture of claim 15, wherein the attachment arrangement to control the level of shock transferred to the test specimen is further comprises a predetermined torque value by which each fastener is tightened; a predetermined thickness, size and shape of the slap plate; a selected material from which the slap plate is formed; an orientation of the slap plate relative to the shaker armature; a predetermined spacing between the slap plate and the shaker armature or a number of spacers associated with each fastener to form the spacing; and one or more additional slap plates.

17. The fixture of claim 14, wherein the slap plate and the host platform have substantially the same dimensions.

18. A method for inducing shock, comprising:
- attaching a slap plate to a shaker armature of a shaker table system to impart a shock to any object being tested by the system; and
- using a specific attachment arrangement for attaching the slap plate to the shaker armature to control a level of shock imparted to any object being tested; and
- controlling the level of shock imparted to any object being tested wherein controlling the level of shock imparted comprises:
  - attaching the slap plate to the shaker armature with a plurality of fasteners, wherein each of the plurality of fasteners extend through the slap plate and are received in a threaded opening formed in the shaker armature, and
  - inserting a predetermined number of spacers associated with each fastener to provide a selected spacing between the slap plate and the shaker armature.

19. The method of claim 18, further comprising controlling the level of shock imparted to any object being tested by selecting the specific attachment arrangement and selecting a configuration of the slap plate.

20. The method of claim 19, wherein controlling the level of shock imparted to any object being tested further comprises:
- selecting a number of fasteners attaching the slap plate to the shaker armature;
- selecting a location of each fastener relative to other fasteners attaching the slap plate to the shaker armature;
- tightening each fastener by a predetermined torque;
- selecting a thickness, size and shape of the slap plate;
- selecting a material from which the slap plate is formed;
- selecting an orientation of the slap plate relative to the shaker armature; and
- using one or more additional slap plates.

21. A method for inducing shock, comprising:
- amplifying a shock force from a shaker armature of a shaker system by attaching a slap plate to the shaker armature; and
- controlling a level of amplification of the shock force imparted to the object being tested by using a specific attachment arrangement for attaching the slap plate to the shaker armature and using a specific configuration of the slap plate, wherein controlling the level of amplification of the shock force comprises:
  - attaching the slap plate to the shaker armature with a plurality of fasteners, wherein each of the plurality of fasteners extend through the slap plate and are received in a threaded opening formed in the shaker armature;
  - selecting a pattern of the fasteners attaching the slap plate to the shaker armature; and
  - providing a spacing of a predetermined width between the slap plate and the shaker armature.

22. The method of claim 21, wherein using a specific configuration of the slap plate, comprises:
- selecting a thickness, size and shape of the slap plate;
- selecting a material from which the slap plate is formed;
- selecting an orientation of the slap plate relative to the shaker armature; and
- using one or more additional slap plates.

23. The method of claim 21, further comprising simulating pyrotechnic event associated with a launch of a space vehicle by the shock force.

* * * * *